United States Patent
Thyamagondlu et al.

(10) Patent No.: US 11,232,053 B1
(45) Date of Patent: Jan. 25, 2022

(54) MULTI-HOST DIRECT MEMORY ACCESS SYSTEM FOR INTEGRATED CIRCUITS

(71) Applicant: Xilinx, Inc., San Jose, CA (US)

(72) Inventors: Chandrasekhar S. Thyamagondlu, Sunnyvale, CA (US); Darren Jue, Sunnyvale, CA (US); Ravi Sunkavalli, San Jose, CA (US); Akhil Krishnan, San Jose, CA (US); Tao Yu, Campbell, CA (US); Kushagra Sharma, Santa Clara, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 16/896,765

(22) Filed: Jun. 9, 2020

(51) Int. Cl.
*G06F 13/28* (2006.01)
*G06F 13/24* (2006.01)

(52) U.S. Cl.
CPC .............. *G06F 13/28* (2013.01); *G06F 13/24* (2013.01)

(58) Field of Classification Search
CPC ........... G06F 13/00; G06F 13/28; G06F 13/24
See application file for complete search history.

(56) References Cited

U.S. PATENT DOCUMENTS

| | | | |
|---|---|---|---|
| 7,577,707 B2 | 8/2009 | Hufferd et al. | |
| 7,590,790 B2 | 9/2009 | Wang et al. | |
| 7,752,349 B2* | 7/2010 | Ishida | G06F 13/28 710/22 |
| 8,504,373 B2 | 8/2013 | Bansal et al. | |
| 2003/0021346 A1 | 1/2003 | Bixby et al. | |
| 2003/0097498 A1* | 5/2003 | Sano | H04L 49/602 710/22 |
| 2004/0019729 A1 | 1/2004 | Kelley et al. | |
| 2005/0114566 A1 | 5/2005 | Chen et al. | |
| 2005/0228913 A1 | 10/2005 | Matthews et al. | |
| 2006/0265531 A1 | 11/2006 | Adams et al. | |
| 2007/0208895 A1 | 9/2007 | Chang et al. | |
| 2010/0186014 A1 | 7/2010 | Vaghani et al. | |
| 2010/0321397 A1 | 12/2010 | Ginzburg | |
| 2013/0160016 A1* | 6/2013 | Gummaraju | G06F 9/5044 718/102 |
| 2015/0134891 A1 | 5/2015 | Jo | |
| 2016/0203091 A1 | 7/2016 | Lee | |

(Continued)

FOREIGN PATENT DOCUMENTS

| | | |
|---|---|---|
| WO | 2010012568 A1 | 2/2010 |
| WO | 2020097013 A1 | 5/2020 |

OTHER PUBLICATIONS

"QDMA Subsystem for PCI Express v1.0," Product Guide PG302 (v1.0), Vivado Design Suite, Apr. 17, 2018, Xilinx, Inc., Copyright © 2018, San Jose, CA, 157 pg.

(Continued)

*Primary Examiner* — Tim T Vo
*Assistant Examiner* — Kim T Huynh
(74) *Attorney, Agent, or Firm* — Kevin T. Cuenot

(57) ABSTRACT

A direct memory access (DMA) system can include a memory configured to store a plurality of host profiles, a plurality of interfaces, wherein two or more of the plurality of interfaces correspond to different ones of a plurality of host processors, and a plurality of data engines coupled to the plurality of interfaces. The plurality of data engines are independently configurable to access different ones of the plurality of interfaces for different flows of a DMA operation based on the plurality of host profiles.

20 Claims, 7 Drawing Sheets

(56) References Cited

U.S. PATENT DOCUMENTS

| | | |
|---|---|---|
| 2017/0206169 A1 | 7/2017 | Coppola et al. |
| 2019/0065290 A1 | 2/2019 | Custodio et al. |
| 2019/0138493 A1 | 5/2019 | Teh et al. |
| 2020/0151120 A1 | 5/2020 | Thyamagondlu et al. |
| 2020/0153756 A1 | 5/2020 | Thyamagondlu et al. |

OTHER PUBLICATIONS

"Network Acceleration," Xilinx Developer Forum 2018 (Silicon Valley), Oct. 1, 2018, XP055684236, Retrieved from the Internet: <https://www.xilinx.com/content/dam/xilinx/imgs/developer-forum/2018-silicon-valley/Cloud-Converged-10-Acceleration-Platform.pdf>, retrieved Apr. 8, 2020, pp. 5-13.

\* cited by examiner

400

---

Select, using a descriptor engine of a direct memory access system, a host profile from a plurality of host profiles stored in a memory based on a received doorbell message
402

---

Fetch, using the descriptor engine, a descriptor specified by the doorbell message via a first interface of a plurality of interfaces of the direct memory access system, wherein at least two of the plurality of interfaces correspond to different ones of a plurality of host processors and the first interface is specified by the host profile
404

---

Initiate, using a data mover engine of the direct memory access system, a data transfer flow based on the descriptor
406

FIG. 4

MULTI-HOST DIRECT MEMORY ACCESS SYSTEM FOR INTEGRATED CIRCUITS

TECHNICAL FIELD

This disclosure relates to integrated circuits (ICs) and, more particularly, to a direct memory access (DMA) system for use within an IC and that supports multiple different host processors.

BACKGROUND

Computing systems, e.g., servers, often incorporate one or more peripheral devices. These peripheral devices, e.g., "cards," may perform functions such as hardware acceleration and/or network acceleration. Typically, the peripheral devices are coupled to the computing system via a communication bus such as, for example, a Peripheral Component Interconnect Express (PCIe) bus. Data can be moved back and forth between the peripheral device and the server by way of direct memory access (DMA) operations. A DMA engine, for example, may be implemented on the peripheral device. The central processing unit (CPU) of the computing system offloads the DMA operations to the DMA engine. While the DMA engine performs the operations, the CPU is tasked with managing operation of the DMA engine on the peripheral device. Within certain computing environments, however, management of the DMA engine can consume significant resources of the CPU thereby hindering performance of the computing system.

SUMMARY

In one aspect, a direct memory access (DMA) system includes a memory configured to store a plurality of host profiles, a plurality of interfaces, wherein at least two of the plurality of interfaces correspond to different ones of a plurality of host processors, and a plurality of data engines coupled to the plurality of interfaces. The plurality of data engines are independently configurable to access different ones of the plurality of interfaces for different flows of a DMA operation based on the plurality of host profiles.

In another aspect, a method of performing a data transfer in a multi-host system includes selecting, using a descriptor engine of a DMA system, a first host profile from a plurality of host profiles stored in a memory based on a received doorbell message. The method can include fetching, using the descriptor engine, a descriptor specified by the doorbell message via a first interface of a plurality of interfaces of the DMA system. Two or more of the plurality of interfaces correspond to different ones of a plurality of host processors. The first host profile specifies the first interface. The method also can include initiating, using a data mover engine of the DMA system, a data transfer flow based on the descriptor.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 4 illustrates an example method of operation of a DMA system configured for multi-host operation.

DETAILED DESCRIPTION

Figure 1:
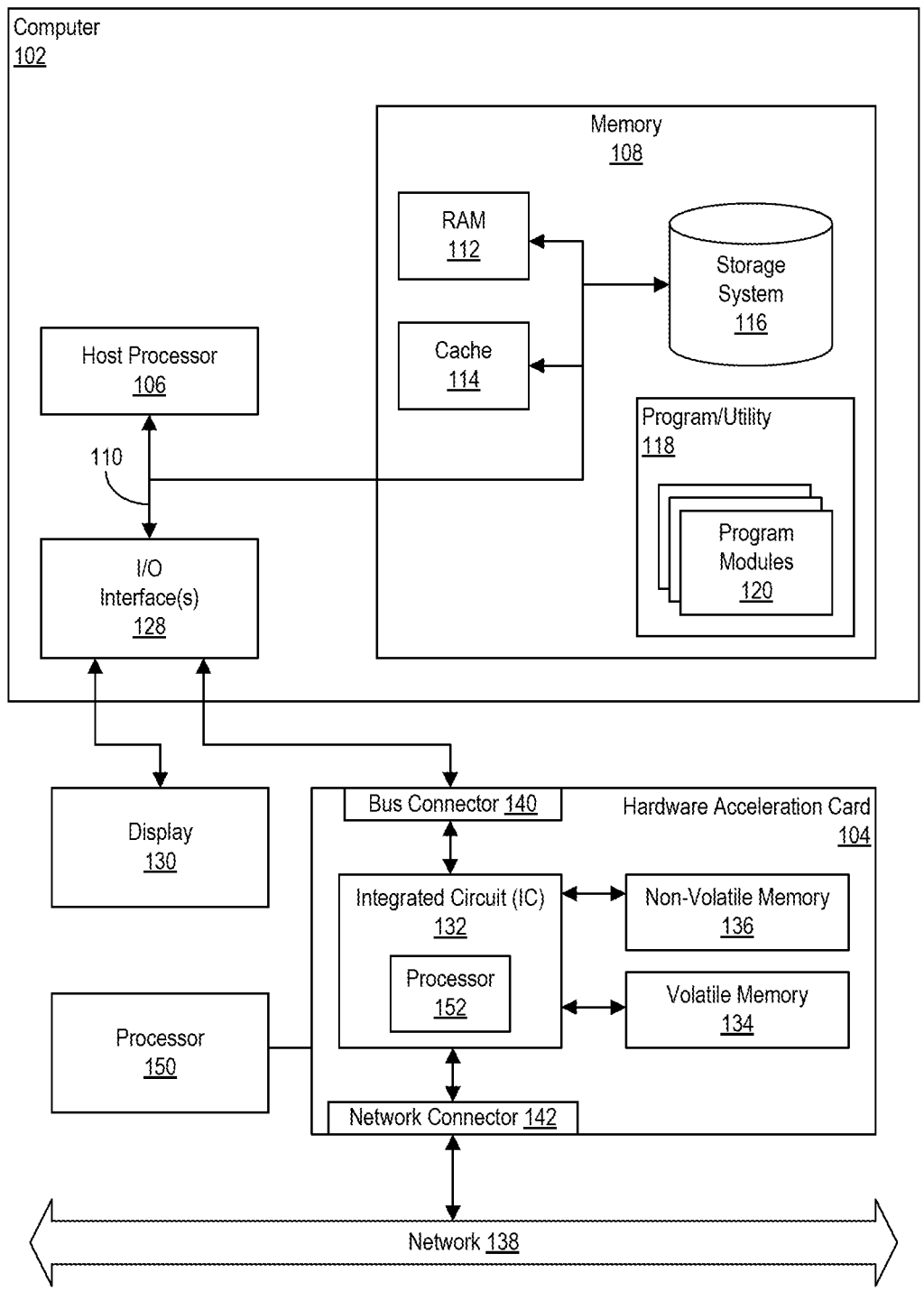
FIG. 1 illustrates an example of a multi-host system for use with the inventive arrangements described within this disclosure.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to a direct memory access (DMA) system for use within an IC that supports multiple different host processors. A conventional DMA engine of a peripheral device is capable of performing DMA operations. In doing so, the host processor (e.g., central processing unit or CPU) of the computing system coupled to the peripheral device is tasked with managing operation of the DMA engine on the peripheral device. Management of the DMA engine can consume significant resources of the CPU thereby hindering performance of the computing system. Managing DMA engines may be an even more significant issue in computing environments that include a large number of processors and/or multiple virtual machines.

In accordance with the inventive arrangements described herein, a DMA system is provided that supports the use of two or more different host processors. The DMA system supports the assignment of different flows of DMA operations to different host processors in the multi-host system. These different flows may be controlled by hardware while retaining the flexibility of software programmability. In a multi-host configuration as described within this disclosure, one or more processing elements other than the CPU, e.g., one or more other host processors, may perform management functions for the DMA system. In some implementations, the processing elements may be bare-metal processors implemented on, or coupled to, the peripheral device. In the case of bare-metal processors, for example, the entire processor (e.g., the entire CPU) is given/used by the customer such that no cores of the CPU are available for system and/or network management functions such as Open vSwitch (OVS). Accordingly, where a network accelerator such as a Network Interface Card (NIC) is used in combination with bare-metal processors, another processor is required with the NIC. The inventive arrangements described herein allow such other processors to perform DMA system management functions. In other cases where the CPU may perform system and/or network management functions, allowing other host processors to operate with the NIC to perform DMA system management functions frees up clock cycles of the CPU of the computing system (e.g., server) for use in performing other tasks.

The DMA system may include a plurality of different data engines and may use different ones of the data engines to perform different flows of a given DMA operation. In performing the DMA operation, for example, different ones of the data engines may be independently controlled to perform these different flows over different ones of a plurality of interfaces included in the DMA system. The different interfaces correspond to different address spaces and, as such, different host processors. For example, different data engines may perform different flows of a DMA operation including, but not limited to, a data transfer flow, a completion flow, and/or an interrupt flow. These different flows may be directed to different address spaces. Further, these different flows may be directed to different address spaces despite being part of a same DMA operation.

In another example implementation, the DMA system facilitates shared resource utilization among the multiple host processors. The DMA system may also provide a common driver interface that may be used by each of the different host processors of the multi-host system to access and/or manage the DMA system. The DMA system further facilitates distributed computing as implemented by the multi-host system.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example of a multi-host system (system) 100 for use with the inventive arrangements described within this disclosure. System 100 includes a computer (e.g., server) 102 coupled to a hardware acceleration card (card) 104. The components of computer 102 may include, but are not limited to, a host processor 106 (e.g., a CPU), a memory 108, and a bus 110 that couples various system components including memory 108 to host processor 106. Host processor 106 may be implemented as any of a variety of processors that are capable of executing program code. Example processor types include, but are not limited to, processors having an x86 type of architecture (IA-32, IA-64, etc.), Power Architecture, ARM processors, and the like.

Bus 110 represents one or more of any of several types of communication bus structures, including a memory bus or memory controller, a peripheral bus, an accelerated graphics port, and a processor or local bus using any of a variety of available bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer 102 typically includes a variety of computer readable media. Such media may be any available media that is accessible by computer 102 and may include any combination of volatile media, non-volatile media, removable media, and/or non-removable media.

Memory 108 may include computer readable media in the form of volatile memory, such as random-access memory (RAM) 112 and/or cache memory 114. Computer 102 may also include other removable/non-removable, volatile/non-volatile computer system storage media. By way of example, storage system 116 may be provided for reading from and writing to a non-removable, non-volatile magnetic media or solid state drive (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each may be connected to bus 110 by one or more data media interfaces. As will be further depicted and described below, memory 108 may include at least one computer program product having a set (e.g., at least one) of program modules (e.g., program code) that are configured to carry out the functions and/or operations described within this disclosure.

For example, program/utility 118, having a set (at least one) of program modules 120 which may include, but are not limited to, an operating system, one or more application programs (e.g., user applications), other program modules, and/or program data, is stored in memory 108. Program modules 120 generally carry out the functions and/or methodologies as described herein at least with respect to operations performed by computer 102. For example, program modules 120 may implement a software stack. The software stack may implement a runtime environment capable of performing the computer 102 operations described herein. In one aspect, program modules 120 include a driver or daemon capable of communicating with hardware acceleration card 104 and/or IC 132.

Program/utility 118 is executable by host processor 106. Program/utility 118 and any data items used, generated, and/or operated upon by host processor 106 are functional data structures that impart functionality when employed by host processor 106. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer 102 may include one or more Input/Output (I/O) interfaces 128 communicatively linked to bus 110. I/O interface(s) 128 allow computer 102 to communicate with external devices, couple to external devices that allow user(s) to interact with computer 102, couple to external devices that allow computer 102 to communicate with other computing devices, and the like. For example, computer 102 may be communicatively linked to a display 130 and to hardware acceleration card 104 through I/O interface(s) 128. Computer 102 may be coupled to other external devices such as a keyboard (not shown) via I/O interface(s) 128. Examples of I/O interfaces 128 may include, but are not limited to, network cards, modems, network adapters, hardware controllers, etc.

In an example implementation, the I/O interface 128 through which computer 102 communicates with hardware acceleration card 104 is a PCIe adapter. Hardware acceleration card 104 may be implemented as a circuit board that couples to computer 102. Hardware acceleration card 104 may, for example, be inserted into a card slot, e.g., an available bus and/or PCIe slot, of computer 102.

In one example, hardware acceleration card 104 is implemented as a network accelerator such as a Network Interface Card (NIC). Hardware acceleration card 104 includes an IC 132. IC 132 may implement one or more hardware accelerators. In one example, IC 132 is implemented as an Application-Specific IC (ASIC). IC 132 may be implemented entirely using hardened circuitry. In another example, IC 132 is implemented as a programmable IC. An example of a programmable IC is a Field Programmable Gate Array. In other examples, IC 132 may include a combination of hardened circuitry and programmable circuitry or logic.

In the example of FIG. 1, hardware acceleration card 104 optionally includes a volatile memory 134 coupled to IC 132 and optionally a non-volatile memory 136 also coupled to IC 132. Volatile memory 134 may be implemented as a RAM that is external to IC 132. Volatile memory 134 is considered a "local memory" of IC 132, whereas memory 108, being within computer 102, is not considered local to IC 132. Non-volatile memory 136 may be implemented as flash memory. Non-volatile memory 136 is also external to IC 132 and may be considered local to IC 132.

In the example of FIG. 1, hardware acceleration card 104 includes a bus connector (e.g., a physical connector) 140. Bus connector 140 may be used to physically couple hardware acceleration card 104 to the communication bus communicatively linking computer 102 with hardware acceleration card 104. Bus connector 140 is further coupled to IC 132. For example, bus connector 140 may be implemented as a PCIe connector (e.g., a card edge or other connector). Hardware acceleration card 104 further can include a network connector 142 (e.g., a physical connector). Network connector 142 may be used to physically connect hardware acceleration card 104 to network 138. Network connector 142, for example, may be an Ethernet port. IC 132 is coupled to network connector 142.

In one example, network 138 is an Ethernet network. Network 138 may operate at any of a variety of different speeds. For example, network 138 may be a 10G, 25G, 50G, 100G, 200G, 400G, or other speed network. In particular implementations, network 138 may be, include, or couple to a 5G network. IC 132, being coupled to network connector 142, is communicatively linked to network 138. For example, IC 132 may be connected, via network 138, to an Ethernet switch or one or more other network connected devices.

System 100 may include one or more additional processors such as, for example, processor 150 and/or processor 152. For example, IC 132 may be communicatively linked to one or more other processors such as processor 150 that may also operate as a host processor. Such other processors may be located on hardware acceleration card 104, located on other cards communicatively linked to hardware acceleration card 104, or both. Further, IC 132 optionally may include an embedded processor such as processor 152 that is capable of operating as a host processor. Operation and connectivity of further processors such as processors 150 and/or 152 is described herein in further detail with reference to the remaining figures.

In another aspect, additional processors 150 and/or 152 may execute suitable drivers capable of communicating with hardware acceleration card 104 and/or IC 132 and may have access to a particular address space including memory (not shown).

FIG. 1 is not intended to suggest any limitation as to the scope of use or functionality of the examples described herein. Computer 102 is an example of computer hardware (e.g., a system) that is capable of performing the various operations described within this disclosure relating to hardware acceleration card 104 and/or IC 132.

Computer 102 is only one example implementation of a computer that may be used with a hardware acceleration card. Computer 102 is shown in the form of a computing device, e.g., a server. Computer 102 can be practiced as a standalone device, as a bare metal server, in a cluster, or in a distributed cloud computing environment. In a distributed cloud computing environment, tasks are performed by remote processing devices that are linked through a communications network. In a distributed cloud computing environment, program modules may be located in both local and remote computer system storage media including memory storage devices.

As used herein, the term "cloud computing" refers to a computing model that facilitates convenient, on-demand network access to a shared pool of configurable computing resources such as networks, servers, storage, applications, ICs, and/or services. These computing resources may be rapidly provisioned and released with minimal management effort or service provider interaction. Cloud computing promotes availability and may be characterized by on-demand self-service, broad network access, resource pooling, rapid elasticity, and measured service.

Computer 102 is operational with numerous other general-purpose or special-purpose computing system environments or configurations. Examples of computing systems, environments, and/or configurations that may be suitable for use with computer 102 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 2A:
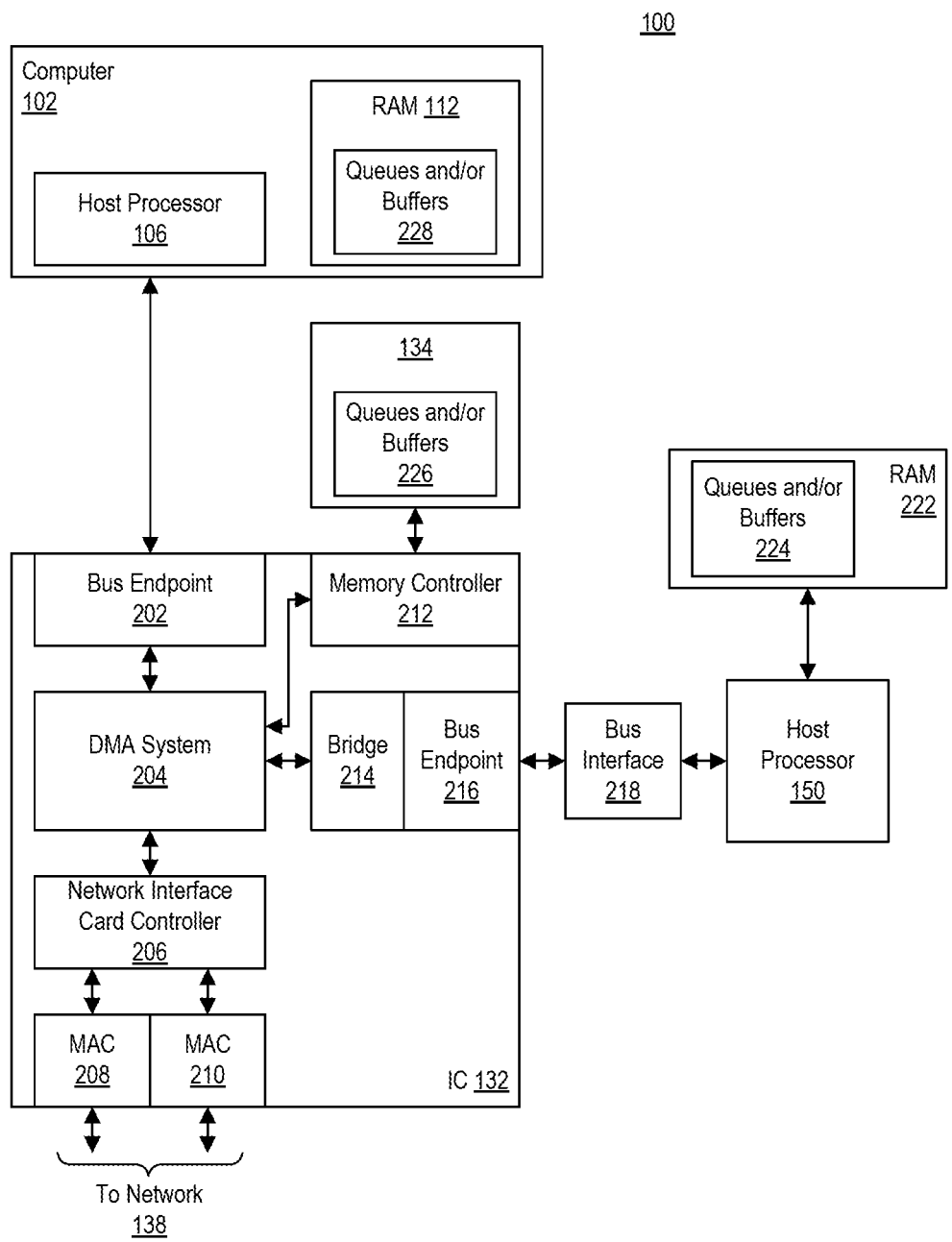
FIGS. 2A and 2B illustrate further example implementations of the multi-host system of FIG. 1.
Figure 2B:
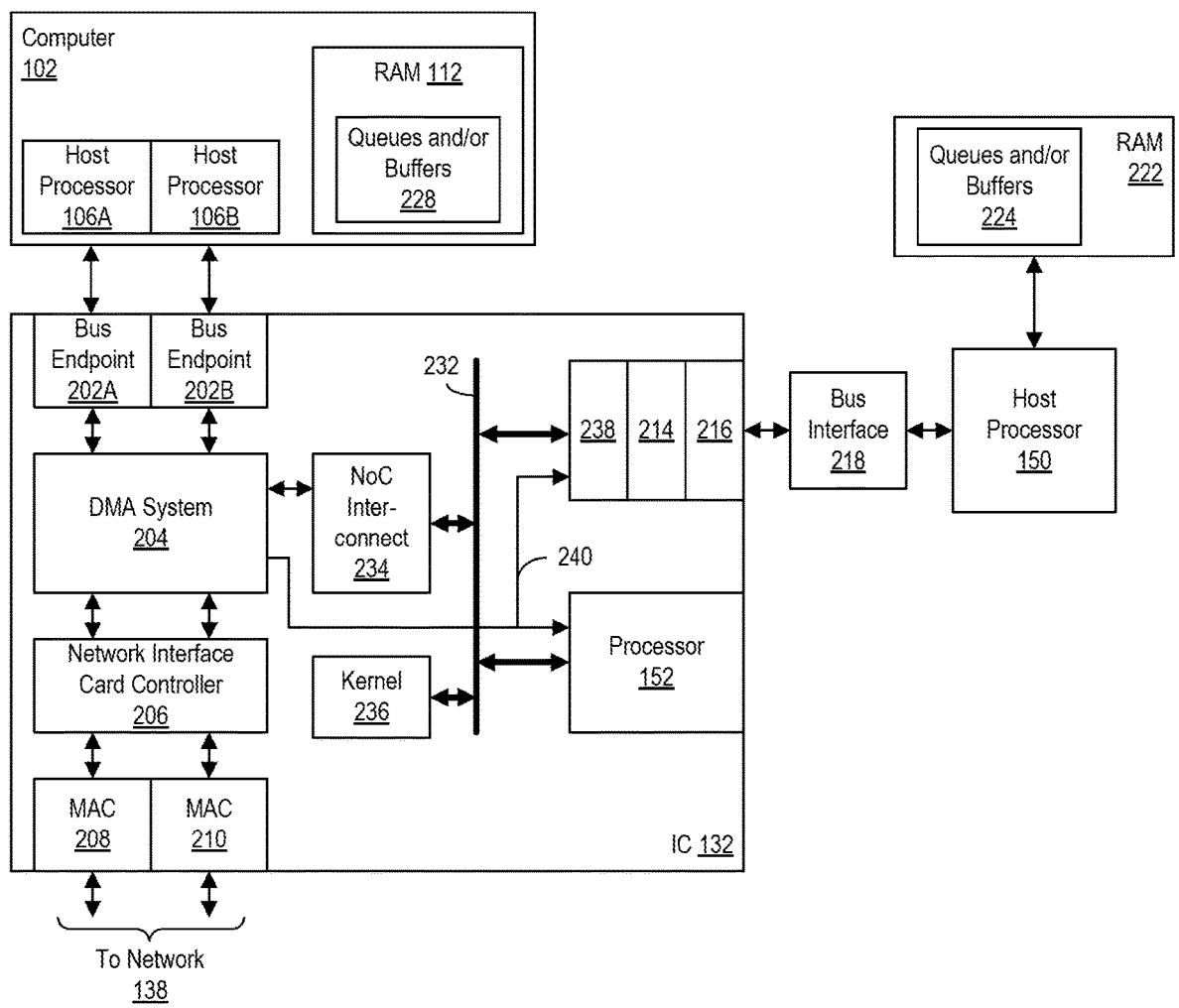

FIGS. 2A and 2B illustrate further example implementations of system 100. In the examples of FIGS. 2A and 2B, for purposes of illustration and description, certain elements of system 100 are omitted while other elements have been added. For example, certain elements of computer 102 are omitted as are other elements such as network accelerator card 104 on which IC 132 may be disposed and processor 152. Certain other implementation details are added as described in greater detail below.

The example of FIG. 2A illustrates three different address spaces. The first address space is that of hardware acceleration card 104 (e.g., "card") and includes volatile memory 134 and any memory that may be included within IC 132. The second address space is that of host processor 106 and includes RAM 112. The third address space is that of host processor 150 and includes RAM 222. For purposes of discussion, reference to a particular host processor or memory may be used from time-to-time as a means to refer to the particular address space in which that host processor or memory resides.

In the example of FIG. 2A, IC 132 includes a bus endpoint 202. Bus endpoint 202 is capable of establishing a communication link with computer 102. In one aspect, bus endpoint 202 is implemented as a PCIe endpoint. Bus endpoint 202 is coupled to a DMA system 204. DMA system 204 is coupled to a network interface card controller or NIC controller 206. NIC controller 206 is further coupled to MACs 208 and 210.

The number of MACs illustrated in FIG. 2A is for purposes of illustration and not limitation. Fewer or more MACs may be included. MACs 208 and 210 are coupled to network 138, e.g., via network connector 142. DMA system 204 is also coupled to memory controller 212 and to bus endpoint 216 via bridge 214.

In the example of FIG. 2A, IC 132 is coupled to volatile memory 134 via memory controller 212. Volatile memory 134 may include queues and buffers 226 that are accessible to DMA system 204.

Host processor 150 is coupled to bus endpoint 216 via bus interface 218. Bus endpoint 216 is capable of establishing a communication link with host processor 150. Further, host processor 150 is capable of communicating with RAM 222. RAM 222 includes queues and/or buffers 224. In one example, host processor 150, bus interface 218, and RAM 222 may be disposed on hardware acceleration card 104. In another example, host processor 150, bus interface 218, and RAM 222 may be disposed on another card or circuit board that is communicatively linked with hardware acceleration card 104 and/or IC 132.

Host processor 150 is capable of executing an operating system and one or more applications. Host processor 150 may execute any of a variety of different operating systems. An example operating system that may be executed by host processor 150 is Linux. Examples of processors that may be used to implement host processor 150 include, but are not limited to, processors having an x86 type of architecture (IA-32, IA-64, etc.), processors having a Power Architecture, ARM processors, and the like.

In the example of FIG. 2A, host processor 106 and host processor 150 are capable of accessing and/or communicating with DMA system 204. In one example, DMA system 204 may be controllable through a common driver interface used by each of host processors 106 and 150. As such, each of host processor 106 and host processor 150 may execute a common driver (e.g., though ported for execution by the respective processor and corresponding operating system). Each driver supports distributed computing to communicate with DMA system 204.

In the example of FIG. 2A, DMA system 204 supports communications between multiple different host processors. Communications with host processor 106 are conducted through bus endpoint 202. Communications with host processor 150 are conducted through bridge 214 and bus endpoint 216. DMA system 204 may include an interface connected to bus endpoint 202 and another interface connected to bridge 214. Further, DMA system 204 includes interfaces connected to NIC controller 206.

For purposes of illustration, bus endpoints 202 and 216 may be implemented as PCIe endpoints. In an example implementation, DMA system 204 may convert certain signals to a communication bus and/or protocol that is used internally within IC 132. An example of such a communication bus and corresponding protocol is the Advanced Microcontroller Bus Architecture (AMBA) eXtensible Interface (AXI) bus. An AMBA AXI bus is an embedded microcontroller bus interface for use in establishing on-chip connections between circuit blocks and/or systems. AXI is provided as an example of an on-chip interconnect and/or internal communication protocol that may differ from those used to communicate with host processors external to IC 132. The use of AXI as an example is not intended as a limitation of the inventive arrangements described within this disclosure. Other communication protocols and/or interfaces may be used. Bridge 214 is capable of translating signals between the internal communication protocol and the communication protocol used by bus endpoint 216.

When implementing a DMA data operation, DMA system 204 is capable of accessing queues and/or buffers 226 stored in volatile memory 134, queues and/or buffers 224, and/or queues and/or buffers 228. DMA system 204 is capable of fetching descriptors from any of the address spaces shown to perform DMA operations to support multiple host processors. For example, DMA system 204 may fetch descriptor(s), which specify DMA operations, from queues and/or buffers 224, 226, and/or 228. DMA system 204 is capable of performing DMA operations in the Host-to-Card (H2C) direction or the Card-to-Host (C2H) direction (where "host refers to host processor 106 and/or host processor 150).

In an example implementation, queues are implemented as queue sets. Each queue set can include an H2C queue, a C2H queue, and a Completion (CMPT) queue. The elements of each queue are descriptors. H2C queues and C2H queues in an address space may be written by the driver/software executed by the particular host processor in that address space. Hardware such as DMA system 204 (e.g., a descriptor engine therein) reads from these queues. The H2C queues include descriptors for DMA read operations from a selected host processor memory. The C2H queues carry descriptors for DMA write operations to a selected host processor memory.

For purposes of discussion, a DMA operation may include one or more "flows." These flows may include a descriptor flow, a data transfer flow, a completion flow, and/or an interrupt flow. A descriptor flow includes fetching descriptor(s). A data transfer flow includes transferring data from one address space to another (e.g., performing a read or write). A completion flow includes writing a status descriptor in response to completing a data transfer flow. The status descriptor typically resides at the end of the descriptor ring. An interrupt flow includes generating an interrupt. In an example implementation, these flows may be performed by different data engines of DMA system 204. Further, different ones of the flows for a given DMA operation may be directed to different address spaces in system 100.

For example, DMA system 204 is capable of fetching a descriptor from any of the address spaces illustrated. DMA system 204 is further capable of performing a data transfer flow of a DMA operation by writing data to (or reading data from) host processor 106 and/or to RAM 112 in computer 102, writing data to (or reading data from) host processor 150 and/or RAM 222, and/or writing data to (or reading data from) volatile memory 134 or to other memories contained in IC 132 (not shown). The address space involved in the read or write may be different from the address space from which the descriptor was fetched. In another aspect, DMA system 204 may perform the completion flow with respect to a different address space than the data transfer flow and/or the descriptor flow. For example, DMA system 204 may write a status descriptor to an address space that is different from the address space involved in the data transfer flow and/or the address space from which the descriptor was fetched. DMA system 204 is capable of performing an interrupt flow by generating interrupts to particular destinations, e.g., host processor 106 or to host processor 150. Further, DMA system 204 is capable of generating an interrupt for a given DMA operation to a different processor, e.g., a destination or address space that may be different from that of the descriptor flow, the data transfer flow, and/or the completion flow.

In the example of FIG. 2B, IC 132 includes processor 152 that may serve as a host processor. For purposes of illustration, computer 102 includes a host processor 106A and a host processor 106B. Host processor 106A communicates with bus endpoint 202A. Host processor 106B communicates with bus endpoint 202B. Bus endpoint 202A and bus endpoint 202B each is coupled to DMA system 204.

As pictured, IC 132 includes a Network-on-Chip (NoC) 232. NoC 232 is coupled to processor 152, a NoC interconnect 234, an optional kernel 236, and an adapter 238. NoC 232 is a programmable interconnecting network for sharing data between endpoint circuits in IC 132. The endpoint circuits can be disposed anywhere within IC 132. Endpoint circuits may be implemented as hardwired circuit blocks such as processor 152, kernel 236, NoC interconnect 234, and/or adapter 238. In another example, one or more or all of the endpoints may be implemented in programmable logic that may be included in IC 132. In still another example, some endpoints may be hardwired circuit blocks while other endpoints are implemented in programmable logic.

NoC 232 implements a high-speed network in which data is transferred as packetized data. NoC 232 can include high-speed data paths with dedicated switching. NoC 232 may include one or more horizontal paths, one or more vertical paths, or both horizontal and vertical path(s). In one aspect, NoC 232 is programmable. In that case, within NoC 232, the nets that are to be routed through NoC 232 are unknown until the paths are programmed. For example, configuration data may be loaded into configuration registers for NoC 232 that define how elements within NoC 232 such as switches and interfaces are configured and operate to pass data from switch to switch and among the NoC interfaces to connect the endpoint circuits. NoC 232 may be fabricated as part of IC 132 (e.g., is hardwired) and, while not physically modifiable, may be programmed to establish connections between different endpoints, which may be specified as part of a user circuit design. In that case, NoC 232, upon power-on, does not implement any data paths or routes therein. Once configured, NoC 232 implements data paths or routes between endpoint circuits. In other embodiments, NoC 232 may be preconfigured to implement certain data paths or nets.

Kernel 236 may be an example of a hardware accelerator implemented in IC 132. Kernel 236 may be a hardwired circuit block or implemented in programmable logic. Processor 152 is capable of executing program instructions (e.g., program code) and may be implemented as hardwired circuitry or implemented in programmable logic.

In the example of FIG. 2B, DMA system 204 is capable of reading data from and/or writing data to the appropriate or correct host processor and/or address space. For example, in performing a DMA operation, DMA system 204 is capable of reading from and/or writing to host processor 106A (or a memory in computer 102 corresponding to host processor 106A) via bus endpoint 202A; to processor 152 via NoC interconnect 234 and NoC 232; and/or to host processor 150 (or RAM 222) via NoC interconnect 234, NoC 232, adapter 238, bridge 214, PCIe endpoint 216, and bus interface 218.

In the example of FIG. 2B, DMA system 204 is capable of directing different ones of the flows for a given DMA operation to different address spaces in system 100. DMA system 204 is capable of performing a data transfer flow of a DMA operation by reading data from and/or writing data to a selected host processor. DMA system 204 is capable of performing a completion flow to a selected host processor. Similarly, DMA system 204 is capable of generating interrupts, e.g., by way of interrupt signals 240, to selected host processors.

Figure 3:
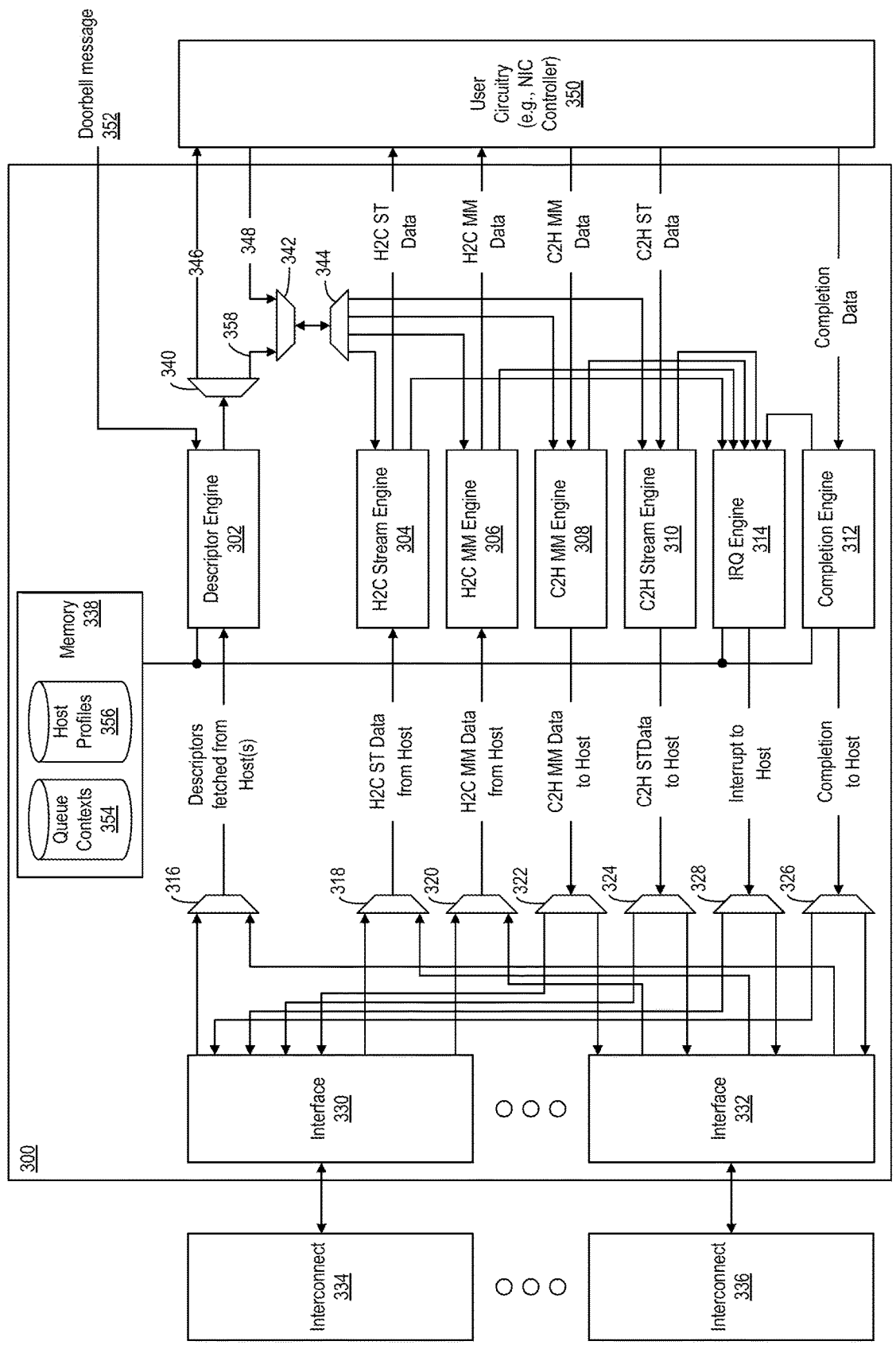
FIG. 3 illustrates an example implementation of a DMA system configured for multi-host operation.

FIG. 3 illustrates an example implementation of a DMA system 300 configured for multi-host operation. DMA system 300 is an example implementation of DMA system 204 of FIG. 2A and/or FIG. 2B. In the example of FIG. 3, DMA system 300 includes a plurality of data engines. The data engines include a descriptor engine 302, a completion engine 312, and an interrupt request (IRQ) engine 314. The data engines further include a plurality of data mover engines. The plurality of data mover engines include an H2C stream engine 304, an H2C memory map (MM) engine 306, a C2H MM engine 308, and a C2H stream engine 310. Each of the data mover engines is capable of processing data of a particular type and/or processing data using a particular communication protocol.

In the example of FIG. 3, the arrows coupling the various circuit blocks shown indicate the direction of data flows. Read operations are generally indicated by arrows entering the data engines on the left side of the data engine, while write operations are generally indicated by arrows exiting the data engines on the left side of the data engines. Appreciably, data flows may include signals flowing in both directions and/or bidirectional signals (e.g., handshaking signals) that effectuate the data flows in the indicated direction.

Each of data engines 302, 304, 306, 308, 310, 312, and 314 is connected to a respective switch 316, 318, 320, 322, 324, 326, and 328. Each of switches 316-328 is coupled to each of a plurality of interfaces 330, 332 contained in DMA system 300. Through the respective switch, each data engine is capable of accessing any one or more of the plurality of interfaces 330, 332. In one aspect, each data engine 302-314 is capable of providing control data, e.g., a host profile data, a host profile identifier (ID) and/or other metadata, to the respective switch coupled thereto to control which of interfaces 330, 332 is used to read or write data as the case may be. The control data may be provided to the switch from the data engine in the same channel as the data or over a control channel separate from the data channel not explicitly shown in FIG. 3.

Though only two interfaces 330, 332 are illustrated, DMA system 300 may include additional interfaces. In general, each interface may be connected to a different address space. With this architecture in mind, each data engine is capable of accessing any of the address spaces coupled to DMA system 300 by way of the appropriate interface 330, 332. Further, each data engine is capable of accessing an interface specific to that data engine and/or particular flow being performed by the data engine.

Interfaces 330, 332 may be implemented as any of a variety of known interfaces for communicating with a host processor or other system. Interconnects 334, 336 may be implemented as complementary interconnects for the respective interfaces. In one example implementation, interface 330 may be implemented as a PCIe interface and interconnect 334 may be implemented as PCIe endpoint 202. Interface 332 may be implemented as an AXI master circuit while interconnect 336 is implemented as bridge 214 or NoC interconnect 234.

For purposes of illustration, consider the example of FIG. 2A where interface 330 may be used to couple to host processor 106 and interface 332 may be used to couple to host processor 150. In that case, interconnect 334 may be implemented as bus endpoint 202. Interconnect 336 may be implemented as an on-chip interconnect such as bridge 214.

In the example of FIG. 2B, interface 330 may be used to couple to host processor 106A. Interface 332 may be used to couple to processor 152. In that case, interconnect 334 may be implemented as bus endpoint 202A. Interconnect 336 may be implemented as NoC interconnect 234 for accessing processor 152 and/or host processor 150. A further interface and interconnect (not shown) may be included and used to couple to host processor 106B. In other examples, more than one processor may be communicatively linked to one interface/interconnect.

In the example of FIG. 3, descriptor engine 302 is capable of communicating directly with each of the data mover engines (e.g., H2C stream engine 304, H2C MM engine 306, C2H MM engine 308, and C2H stream engine 310) via switch 340, connection 358, and switches 342 and 344. For example, descriptor engine 302 is capable of sending descriptors fetched from host processors to selected ones of the data mover engines (304, 306, 308, and/or 310). Further, descriptor engine 302 is capable of sending descriptors fetched from host processors to user circuitry 350 thereby implementing a bypass mode via connection 346. In the bypass mode, descriptor engine 302 does not operate on fetched descriptors and, instead, forwards the fetched descriptors to user circuitry 350. User circuitry 350, which may include a NIC controller (e.g., NIC controller 206) having user-defined tables (e.g., queue contexts and/or host profiles to be described herein in greater detail), is responsible for processing the fetched descriptors and providing the descriptors, post processing, to appropriate ones of the data mover engines 304-310 and/or to completion engine 312 by way of connection 348 and switches 342 and 344.

Further, each of descriptor engine 302, H2C stream engine 304, H2C MM engine 306, C2H MM engine 308, C2H stream engine 310, and completion engine 312 is capable of communicating with user circuitry 350. Each of H2C stream engine 304, H2C MM engine 306, C2H MM engine 308, C2H stream engine 310, and completion engine 312 further is connected to IRQ engine 314 and capable of invoking IRQ engine 314.

Each of data mover engines 304-310 is capable of performing a data transfer flow via interface 330 or 332. For example, H2C stream engine 304 is capable of performing a stream data transfer flow in the H2C direction using interface 330 or 332. In general, the H2C direction refers to a DMA operation where a data mover engine reads data, using a selected one of interfaces 330 or 332 and from a selected host processor coupled to the selected interface. The H2C direction may also refer to transferring the data that is read to user circuitry 350. Thus, in the case of H2C stream engine 304, H2C stream engine 304 is capable of reading H2C stream data, using interface 330 or 332, from a selected host processor and transferring the H2C stream data to user circuitry 350. User circuitry 350 may direct the H2C stream data to a memory of hardware acceleration card 104 or a memory within IC 132.

H2C memory map engine 306 is capable of performing a memory mapped data transfer flow in the H2C direction using interface 330 or 332. Thus, in the case of H2C MM engine 306, H2C MM engine 306 reads H2C MM data, using a selected one of interfaces interface 330 or 332 from a selected host processor coupled to the selected interface. In one aspect, H2C MM engine 306 is capable of transferring the H2C MM data to user circuitry 350. User circuitry 350 may direct the H2C MM data to a memory of hardware acceleration card 104 or a memory within IC 132. In another aspect, H2C MM engine 306 is capable of transferring the H2C MM data out to another selected (e.g., a target) host processor via interface 330 or interface 332. For example, H2C MM engine 306 is capable of receiving H2C MM data over a selected interface and transferring the data out to another (e.g., different) host processor via the same selected interface or another, different interface depending on the particular interface to which the target host processor is coupled.

C2H MM engine 308 is capable of performing a memory mapped data transfer flow in the C2H direction using interface 330 or 332. In general, the C2H direction refers to a DMA operation that transfers data from user circuitry 350 (e.g., a memory of hardware acceleration card 104 and/or within IC 132) through a selected one of interfaces 330 or 332 to a selected (e.g., target) host processor coupled to the selected interface. Thus, C2H MM engine 308 is capable of transferring C2H MM data from user circuitry 350 to a selected host processor via interface 330 or 332. In another aspect, C2H MM engine 308 is also capable of reading C2H MM data from a selected host processor using interface 330 or 332. As such, similar to H2C MM engine 306, C2H MM engine 308 is capable of reading C2H MM data from a selected host processor (e.g., a source) via interface 330 or 332 and either writing the C2H MM data to user circuitry 350 or writing the C2H MM data to a target host processor using interface 330 or 332.

In another example implementation, while multiple MM engines (H2C MM engine 306 and C2H MM engine 308) are shown, a single MM engine may be used that is capable of performing read and write operations over any combination of interfaces 330, 332 and between any combination of host processor(s) and/or user circuitry 350.

C2H stream engine 310 is capable of performing a stream data transfer flow in the C2H direction using interface 330 or 332. C2H stream engine 310 is capable of performing a stream data transfer flow in the C2H direction using interface 330 or 332. Thus, C2H stream engine 310 transfers C2H stream data from user circuitry 350 through a selected one of interfaces 330 or 332 to a selected host processor coupled to the selected interface.

Completion engine 312 is capable of performing a completion flow over interface 330 or 332. A completion flow refers to completion engine 312 writing a status descriptor via a selected one of interfaces 330 or 332 to a selected host processor coupled to the selected interface.

In the example of FIG. 3, each of data mover engines 304-310 and completion engine 312 is connected to IRQ engine 314. IRQ engine 314 is capable of performing an interrupt flow over interface 330 or 332. An interrupt flow refers to IRQ engine 314 generating and/or providing an interrupt over a selected one of interfaces 330 or 332 to a selected host processor coupled to the selected interface. The interrupt flow may be performed by IRQ engine 314 in response to a request to do so from data mover engines 304-310 and/or completion engine 312.

In the example of FIG. 3, only two interfaces 330, 332 are shown. It should be appreciated that DMA system 300 may include more than two interfaces where each of switches 316-328 is connected to each such interface. Further, the particular types and/or combination of interfaces described is for purposes of illustration. It should be appreciated that DMA system 300 may include one, two, or more PCIe interfaces; one, two, or more AXI master circuits; one, two, or more NoC interface circuits; or any combination thereof. Further, interfaces for communication buses and/or protocols other than those described within this specification may be included alone and/or in combination with those described.

In the example of FIG. 3, DMA system 300 may include a memory 338. In one aspect, memory 338 is implemented as an on-chip memory. In another aspect, memory 338 is implemented as volatile memory 134. In the example of FIG. 3, memory 338 is capable of storing queue contexts 354 and host profiles 356.

In one aspect, queue contexts 354 is a data structure including one or more queue contexts. Each queue utilized by DMA system 300 may have a particular queue configuration specified by a queue context stored in queue contexts 354. Each queue context, for example, can include one or more host profile identifiers (IDs). Host profiles 356 may be implemented as a data structure including one or more host profiles. By looking up a particular queue context, a data engine such as descriptor engine 302, IRQ engine 314, and/or completion engine 312 is capable of determining a host profile ID that may be used to look up a particular host profile from host profiles 356.

In one aspect, each host profile can specify information used to perform a read or write with respect to a particular host processor. Thus, determined host profiles provide data engines 302, 312, or 314 with information for configuring the switch coupled thereto (e.g., switches 316, 326, 328) to connect to the appropriate host processor(s) to perform the designated flow. In one aspect, using one or more host profiles, the source host processor from which data is to be read and the target host processor to which the data is to be written can be specified.

In another aspect, each of descriptor engine 302, completion engine 312, and IRQ engine 314 may store its own queue contexts in queue contexts 354 and/or host profiles in host profiles 356. In that case, each data engine 302, 312, and 314 only utilizes its own, specific queue contexts and/or host profiles. In another example, the queue contexts and/or host profiles for each of descriptor 302, completion engine 312, and IRQ engine 314 are stored locally within each respective data engine. That is, the various queue contexts 354 and/or host profiles 356 may be distributed in, and stored in, the respective ones of descriptor engine 302, completion engine 312, and IRQ engine 314.

In the example of FIG. 3, each host processor of system 100 may be uniquely identified by a host profile ID and the particular host profile specified by that host profile ID. In one aspect, each host profile for a particular host processor may specify the particular interface 330, 332 within DMA system 300 to be used to access the address space of the host processor. In this regard, host profiles 356 provide information that may be used to select which of interfaces 330, 332 to use for performing a given flow. In one example, each host profile is capable of specifying the addresses associated with a given host processor. Each host profile, for example, specifies the memory or memories of the host processor and the particular interface 330, 332 to which the memory/memories are attached.

In another aspect, host profiles 356 may include additional routing data that may be used to route the flows through other interconnect circuitry that may be located in IC 132. For example, host profiles 356 may include metadata that can be provided with a flow, e.g., with a transaction, so that the flow may be routed through particular other switches and/or interconnects (e.g., bridge 214 to bus endpoint 216; through NoC 232 to a particular endpoint, or the like).

In an example implementation, descriptor engine 302 may receive a doorbell message 352 from a particular host processor in system 100. In one aspect, the doorbell message may be provided as a Memory Mapped Input/Output (MMIO) operation. Doorbell message 352 may be received via another connection to descriptor engine 302 not illustrated in FIG. 3. Doorbell message 352 may specify information such as a number of descriptors (e.g., one or more) written by the host processor to a queue that are available to be fetched by descriptor engine 302.

In one aspect, each doorbell message 352 may be mapped to a particular queue identifier (ID). Descriptor engine 302 is capable of looking up a particular queue context from queue contexts 354 using the queue ID mapped onto the received doorbell message 352. The queue context may include a base address corresponding to the queue from which the descriptor is to be fetched, one or more different pointer indices based on the particular data engine 302, 312, or 314, and/or information to decode the queue. As noted, the queue context also includes a host profile ID.

Descriptor engine 302 is capable of fetching the host profile from host profiles 356 using the host profile ID obtained from the determined queue context. Based on the host profile, descriptor engine 302 knows which of the interfaces 330, 332 to use to fetch the descriptor. Descriptor engine 302 is capable of fetching the descriptor based on the information specified by the queue context (e.g., the base address and/or pointers specified therein) and the particular interface determined from the host profile.

DMA system 300 is capable of processing the fetched descriptors using one of two different operating modes. In one aspect, descriptor engine 302 determines or selects the particular operating mode for processing fetched descriptor(s) based on the particular host profile used to fetch the descriptors. The host profile indicates whether the descriptors are to be processed using a first operating mode referred to as "internal mode" or a second operating mode referred to as "external mode."

When operating in internal mode, descriptor engine 302 processes the received descriptors. In internal mode, descriptor engine 302 processes the fetched descriptors and provides the processed descriptors to an appropriate data mover engine 304-310 within DMA system 300 to perform a data transfer flow of the DMA operation. In general, data mover engines 304-310 are capable of performing data transfers specified by the descriptor received from descriptor engine 302. In one aspect, the descriptor is fetched and includes host profile data such as a host profile ID (or IDs as the case may be) that the data mover engine may use to configure the switch attached thereto to access the correct interface(s) 330, 332 for performing the read and/or writes. In other alternative examples, data flows may be performed in response to multiple descriptors each including a host profile ID where, for example, a first descriptor specifies a source host processor from which to retrieve data while a second descriptor specifies a destination host processor or other destination (e.g., user circuitry 350) to which the data is provided.

In another aspect, descriptor engine 302 processes the fetched descriptor by adding the host profile data to the descriptor prior to passing the descriptor to the intended data mover engine 304-310. For example, information from host profiles 356 may be incorporated into descriptors by descriptor engine 302 and provided to data mover engines 304-310. The added information from host profiles 356 (e.g., a host profile ID or IDs) may be used by data mover engines 304-310 to control switches 318-324, respectively.

When operating in the internal mode, descriptor engine 302 is notified by the particular data mover engine performing the data transfer flow that the data transfer flow is complete. In response to the notification, descriptor engine 302 is capable of performing a completion flow by writing a status descriptor at the end of a completion ring to indicate that the DMA operation has completed at least up to a particular index.

In the case of the external mode, user circuitry 350 determines the particular data mover engines 304-310 to be used to perform the data transfer flow. Further, user circuitry 350 initiates operation of completion engine 312 and initiates operation of IRQ engine 314. In the external mode, under control of user circuitry 350, a particular data mover engine 304-310 may be invoked to perform the data transfer flow of the DMA operation. User circuitry 350 further is capable of invoking completion engine 312 to perform the completion flow of the DMA operation. User circuitry 350 further is capable of invoking IRQ engine 314 to perform the interrupt flow of the DMA operation.

In external mode, completion engine 312 and IRQ engine 314 each is capable of independently accessing queue contexts 354 (e.g., the particular queue context table for the respective data engine) and host profiles 356 to determine a particular queue context and a particular host profile to be used. For example, based on receiving a processed descriptor from user circuitry 350, completion engine 312 is capable of indexing into queue contexts 354 to determine a queue context and into host profiles 356 to locate a particular host profile that specifies the particular interface 330, 332 to be used to write the status descriptor. Similarly, based on receiving a processed descriptor from user circuitry 350, IRQ engine 314 is capable of indexing into queue contexts 354 to determine a queue context and into host profiles 356 to locate a particular host profile that specifies the particular interface 330, 332 through which the interrupt is generated.

It should be appreciated that since each of descriptor engine 302, completion engine 312, and/or IRQ engine 314 receives processed descriptors from user circuitry 350 in the external mode, each is capable of performing the queue context lookup and host profile lookup independently of the others. For example, user circuitry 350 may include a set of queue contexts and/or host profiles used to process and/or augment the descriptors operated on by user circuitry 350. The queue contexts and/or host profiles may be different from those illustrated in memory 338 to facilitate different processing in the external mode. Thus, each of descriptor engine 302, data mover engines 304-310, completion engine 312, and IRQ engine 314 is independently controllable and may access different address spaces (e.g., interfaces 330, 332) based on the particular host profile data provided to each respective data engine. For a given (e.g., same) DMA operation, each of descriptor engine 302, data mover engines 304-310, completion engine 312, and/or IRQ engine 314 is capable of accessing a same and/or different host processor address space.

Despite the particular operating mode, the descriptor provided to data mover engines 304, 306, 308, and 310 indicates the particular interface and/or interfaces 330, 332 to be used to perform the data transfer flow. Thus, each of data mover engines 304, 306, 308, 310, completion engine 312, and/or IRQ engine 314 is capable of directing data (e.g., communicating) over the correct interface 330, 332 by controlling operation of the respective switch 316, 318, 320, 322, 324, 326, 328 coupled thereto using the host profile data.

H2C stream engine 304 is capable of moving data from a selected host processor memory to hardware accelerator card memory. In the external mode, each completed descriptor may be checked by user circuitry 350 to determine whether a writeback and/or interrupt is required. User circuitry 350 may also inject a descriptor into H2C stream engine 304 via connection 348 to move data from a selected host processor memory to a memory of hardware acceleration card 104. In the internal mode, descriptor engine 302 is capable of delivering descriptors directly to H2C stream engine 304.

H2C MM Engine 306 is capable of moving data from a selected host processor memory to hardware accelerator card memory. In the external mode, each completed descriptor may be checked by user circuitry 350 to determine whether a writeback and/or interrupt is required. User circuitry 350 may also inject a descriptor into H2C MM engine 306 via connection 348 to move data from a selected host processor memory to a memory of hardware acceleration card 104. In the internal mode, descriptor engine 302 delivers memory mapped descriptors directly to H2C MM engine 306.

C2H MM engine 308 is capable of moving data from a memory of hardware acceleration card 104 to a selected host processor memory. In the external mode, each completed descriptor may be checked by user circuitry 350 to determine whether a writeback and/or interrupt is required. User circuitry 350 may also inject a descriptor into C2H MM engine 308 via connection 348 to move data from a memory of hardware acceleration card 104 to a selected host processor memory. In the internal mode, descriptor engine 302 is capable of delivering memory mapped descriptors directly to C2H MM engine 308.

C2H stream engine 310 is capable of moving data from a memory of hardware acceleration card 104 to a selected host processor. In the external mode, each completed descriptor may be checked by user circuitry 350 to determine whether a writeback and/or interrupt is required. User circuitry 350 may also inject a descriptor into C2H stream engine 310 via connection 348 to move data from a memory of hardware acceleration card 104 to a selected host processor memory. In the internal mode, descriptor engine 302 is capable of delivering descriptors directly to C2H stream engine 310.

In one or more example implementations, the host profiles and host profile IDs described herein may be used for purposes of reading data. In that case, each different data mover engine may be preconfigured to write or send retrieved data to a predetermined destination (e.g., a particular host processor or user circuitry). In such example implementations, the host profiles may only be utilized for reading data. Further, fewer or more data mover engines may be included based on the number of host processors to be serviced by DMA system 300.

FIG. 4 illustrates an example method 400 of operation of a DMA system configured for multi-host operation. The DMA system may be implemented as described in connection with the examples of FIGS. 2A, 2B, and/or 3.

In block 402, a descriptor engine of the DMA system selects a host profile from a plurality of host profiles stored in a memory based on a received doorbell message. For example, the doorbell message may be mapped to a particular queue ID that is used to fetch a queue context corresponding to the queue ID. From the queue context, the descriptor engine extracts a host profile ID and, using the host profile ID, fetches a host profile. In block 404, the descriptor engine fetches a descriptor specified by the doorbell message via a first selected interface of a plurality of interfaces of the DMA system. Two or more of the plurality of interfaces correspond to different ones of a plurality of host processors. Further, the first interface is specified by the host profile selected in block 402.

In block 406, a data transfer flow is initiated using a data mover engine of the DMA system. The data transfer flow is initiated based on the descriptor. For example, the descriptor, whether processed by the descriptor engine or user circuitry, may provide host profile data (e.g., one or more host profile IDs) that allows the data mover engine to access the particular interface corresponding to the source (e.g., for a read) and/or destination (e.g., for a write) of the data transfer flow. As noted, in other examples, a data transfer flow may be initiated responsive to multiple descriptors each including a host profile ID.

Figure 5:
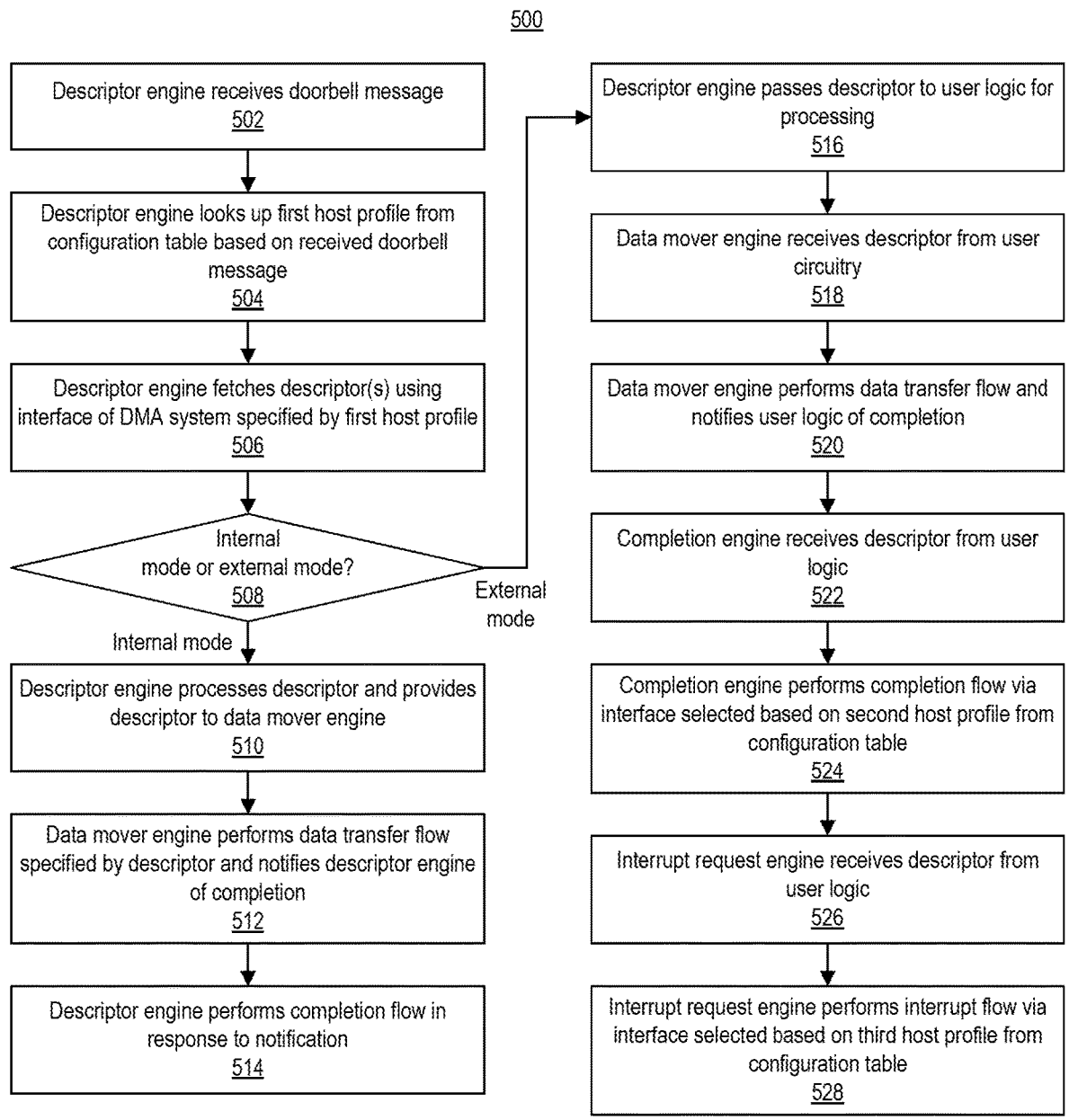
FIG. 5 illustrates another example method of operation of a DMA system configured for multi-host operation.

FIG. 5 illustrates another example method 500 of operation of a DMA system configured for multi-host operation. The DMA system may be implemented as described in connection with the examples of FIGS. 2A, 2B, and/or 3.

In block 502, the descriptor engine receives a doorbell message. In block 504, the descriptor engine looks up a first host profile from the queue contexts 354 and the host profiles 356 based on the received doorbell message. For example, the doorbell message may map onto a queue ID indicating a queue context as described. The descriptor engine is capable of looking up the first host profile using the host profile ID obtained from the queue context. The first host profile specifies the particular interface connected to the descriptor engine to be used in fetching the descriptor(s).

In block 506, the descriptor engine fetches the descriptor(s) via the particular interface determined from the first host profile. For example, based on the host profile data, the descriptor engine directs the fetch through switch 316 to the appropriate interface 330, 332. Thus, the descriptor engine is capable of fetching the descriptor(s) from any of the address spaces of the various host processors of the multi-host system. As discussed, the queue context may also include a base address and one or more pointers used by the descriptor engine to fetch the descriptor(s).

In block 508, the descriptor engine determines the operating mode to be used to process the descriptor(s) that were fetched. In one aspect, the first host profile determined in block 504 may also indicate the operating mode to be used to process the fetched descriptor(s). In the case where the descriptor engine determines that the internal mode is to be used, method 500 continues to block 510. In the case where the descriptor engine determines that the external mode is to be used, method 500 continues to block 516.

Continuing with block 510 in the case where the internal mode is selected, the descriptor engine processes the descriptor and provides the descriptor to a data mover engine. In one aspect, the descriptor specifies the particular data mover engine to be used to perform the data transfer. Accordingly, the descriptor engine provides the descriptor to a selected data mover engine of the plurality of data mover engines as specified by the descriptor. The descriptor may also include the host profile data necessary to access the data to be transferred including the particular interface(s) within the DMA system to be used in performing the data transfer flow for a given DMA operation. In one aspect, the descriptor engine is capable of updating the descriptor to include the host profile data used to access the correct interface for the source and/or destinations.

In block 512, the data mover engine performs the data transfer flow specified by the descriptor and notifies the descriptor engine in response to completing the data transfer flow of the DMA operation. Using the host profile data from the descriptor, the data mover engine controls the connected switch to access the particular interface specified by the descriptor to implement the data transfer flow. In response to completing the data transfer flow specified by the descriptor, the data mover engine is capable of notifying the descriptor engine of the completion.

In block 514, the descriptor engine is capable of performing a completion flow for the DMA operation in response to the notification from the data mover engine. The descriptor engine, for example, is capable of writing a status descriptor to the descriptor ring using the same interface of the DMA system over which the descriptor(s) were initially fetched in block 506.

Continuing with block 516 from block 508 in the case where the external mode is selected, the descriptor engine provides the descriptor to the user circuitry for processing. In block 518, a data mover engine receives the descriptor from the user circuitry. The descriptor received by the data mover engine may have undergone processing by the user circuitry. The user circuitry, in the external mode, selects the particular data mover engine to be used to perform a data transfer flow of a given DMA operation and provides the descriptor to the selected data mover engine.

The descriptor provided to the selected data mover engine may also include host profile data necessary to access the data to be transferred including the particular interface within the DMA system to be used in performing the data transfer flow for a given DMA operation. In one aspect, the descriptor may have included such information upon being fetched or when fetched. In another aspect, the user circuitry is capable of determining a particular host profile(s) to be used for the data transfer and updating the descriptor to include host profile data from such host profile(s) so that the data mover engine accesses the correct interface(s). The host profile data included in the descriptor may be distinct, different, and/or independently determined from the host profile data used to fetch the descriptor in block 506.

In block 520, the data mover engine is capable of performing the data transfer flow of the DMA operation and notifying the user circuitry in response to completing the data transfer flow specified by the descriptor. Using the data from the descriptor, the data mover engine controls the connected switch to access the particular interface specified by the host profile data of the descriptor to implement the data transfer flow. In response to completing the data transfer specified by the descriptor, the data mover engine is capable of notifying the user circuitry.

In block 522, the completion engine receives a descriptor from the user circuitry. In block 524, the completion engine performs a completion flow of the DMA operation based on a second host profile determined from the queue contexts 354 and host profiles 356. For example, the descriptor received by the completion engine may map onto a queue ID indicating a queue context. The completion engine is capable of obtaining a host profile ID from the queue context to determine the second host profile for use in performing the completion flow. As discussed, the queue contexts and/or host profiles used by the completion engine may be distinct and/or different from the queue contexts and/or host profiles for the descriptor engine.

In this regard, the second host profile determined by the completion engine may be different from the first host profile determined by the descriptor engine. Further, the host profile may specify different host profile data such that the completion engine writes the status descriptor over a different interface of the DMA system than was used for the data transfer flow and/or than was used to fetch the descriptor by the descriptor engine. Using the host profile data determined from the second host profile, the completion engine controls the connected switch to access the particular interface specified by the host profile data to write the status descriptor. It should be appreciated that the particular interface used to perform the completion flow may be the same or different from the interface used to fetch the descriptor and/or the interface used to perform the data transfer flow.

In block 526, the IRQ engine receives a descriptor from the user circuitry. In block 528, the IRQ engine performs an interrupt flow of the DMA operation based on a third host profile determined from the queue contexts 354 and host profiles 356. In one aspect, the queue contexts and/or host profiles used for the IRQ engine may be distinct and/or different from the host profiles for the descriptor engine, the host profile data used by the data mover engine, and/or the host profile used by the completion engine. For example, the host profile may specify that the IRQ engine generate the interrupt over a different interface of the DMA system than was used for the data transfer flow, a different interface than was used to fetch the descriptor by the descriptor engine, and/or a different interface than was used by the completion engine. Using the data determined from the third host profile, the IRQ engine controls the connected switch to access the particular interface specified by the host profile to generate the interrupt. It should be appreciated that the particular interface used to perform the interrupt flow may be the same as or different from the interface used to fetch the descriptor, the interface used to perform the data transfer flow, and/or the interface used to perform the completion flow.

Figure 6:
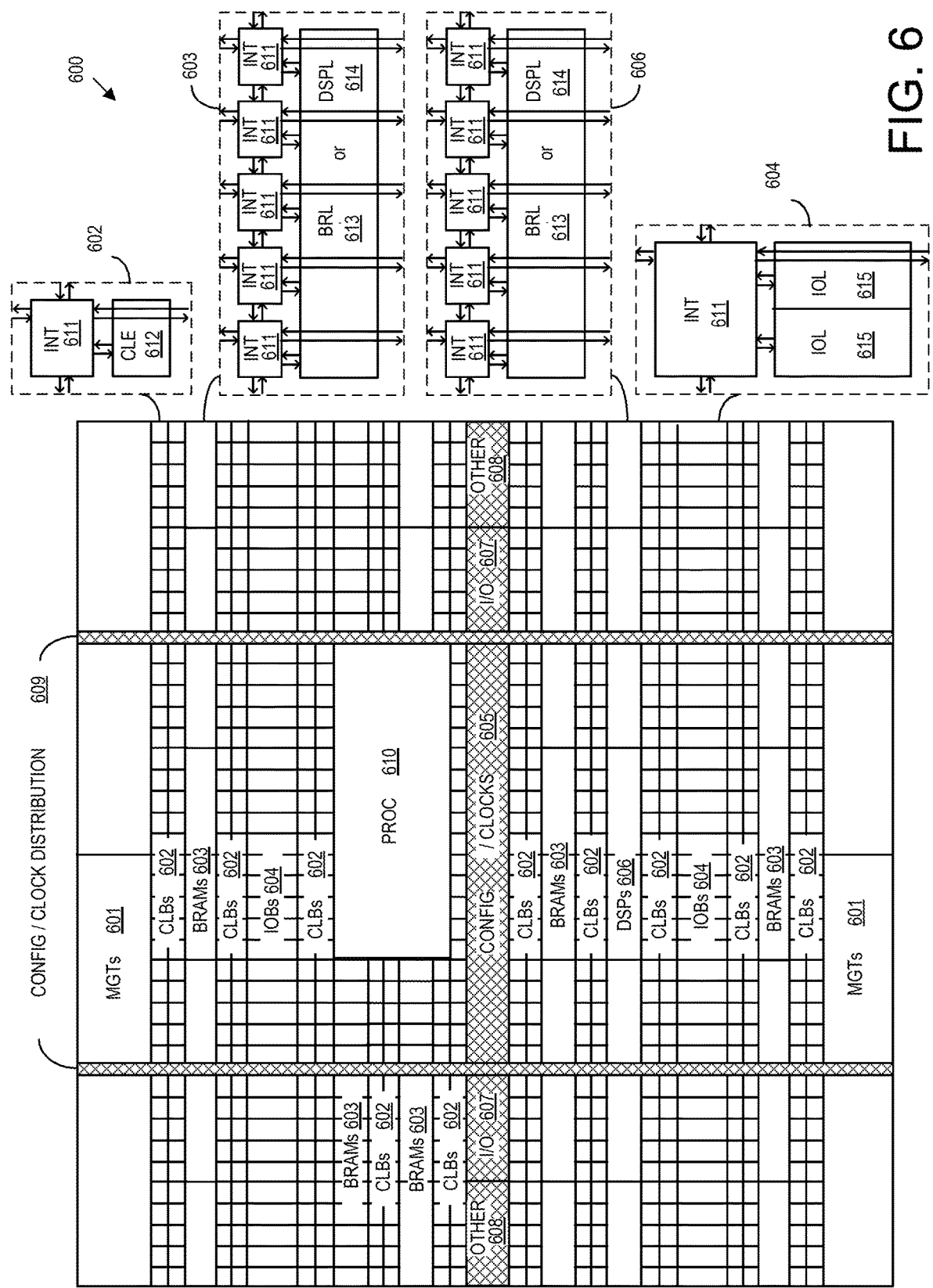
FIG. 6 illustrates an example architecture for an IC.

FIG. 6 illustrates an example architecture 600 for an IC. Architecture 600 may be used to implement IC 132, for example. In one aspect, architecture 600 may be implemented within a programmable IC. For example, architecture 600 may be used to implement a field programmable gate array (FPGA). Architecture 600 may also be representative of a system-on-chip (SoC) type of IC. An SoC is an IC that includes a processor that executes program code and one or more other circuits. The other circuits may be implemented as hardwired circuitry, programmable circuitry, and/or a combination thereof. The circuits may operate cooperatively with one another and/or with the processor.

As shown, architecture 600 includes several different types of programmable circuit, e.g., logic, blocks. For example, architecture 600 may include a large number of different programmable tiles including multi-gigabit transceivers (MGTs) 601, configurable logic blocks (CLBs) 602, random access memory blocks (BRAMs) 603, input/output blocks (IOBs) 604, configuration and clocking logic (CONFIG/CLOCKS) 605, digital signal processing blocks (DSPs) 606, specialized I/O blocks 607 (e.g., configuration ports and clock ports), and other programmable logic 608 such as digital clock managers, analog-to-digital converters, system monitoring logic, and so forth.

In some ICs, each programmable tile includes a programmable interconnect element (INT) 611 having standardized connections to and from a corresponding INT 611 in each adjacent tile. Therefore, INTs 611, taken together, implement the programmable interconnect structure for the illustrated IC. Each INT 611 also includes the connections to and from the programmable logic element within the same tile, as shown by the examples included at the right of FIG. 6.

For example, a CLB 602 may include a configurable logic element (CLE) 612 that may be programmed to implement user logic plus a single INT 611. A BRAM 603 may include a BRAM logic element (BRL) 613 in addition to one or more INTs 611. Typically, the number of INTs 611 included in a tile depends on the height of the tile. As pictured, a BRAM tile has the same height as five CLBs, but other numbers (e.g., four) also may be used. A DSP tile 606 may include a DSP logic element (DSPL) 614 in addition to an appropriate number of INTs 611. An 10B 604 may include, for example, two instances of an I/O logic element (IOL) 615 in addition to one instance of an INT 611. The actual I/O pads connected to IOL 615 may not be confined to the area of IOL 615.

In the example pictured in FIG. 6, a horizontal area near the center of the die, e.g., formed of regions 605, 607, and 608, may be used for configuration, clock, and other control logic. Vertical areas 609 extending from this horizontal area may be used to distribute the clocks and configuration signals across the breadth of the programmable IC.

Some ICs utilizing the architecture illustrated in FIG. 6 include additional logic blocks that disrupt the regular columnar structure making up a large part of the IC. The additional logic blocks may be programmable blocks and/or dedicated circuitry. For example, a processor block depicted as PROC 610 spans several columns of CLBs and BRAMs.

In one aspect, PROC 610 may be implemented as dedicated circuitry, e.g., as a hardwired processor, that is fabricated as part of the die that implements the programmable circuitry of the IC. PROC 610 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 610 may be omitted from architecture 600 and replaced with one or more of the other varieties of the programmable blocks described. Further, such blocks may be utilized to form a "soft processor" in that the various blocks of programmable circuitry may be used to form a processor that can execute program code as is the case with PROC 610.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 6 that are external to PROC 610 such as CLBs 602 and BRAMs 603 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 610.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SoC, the configuration bitstream may specify the circuitry that is to be implemented within the programmable circuitry and the program code that is to be executed by PROC 610 or a soft processor. In some cases, architecture 600 includes a dedicated configuration processor that loads the configuration bitstream to the appropriate configuration memory and/or processor memory. The dedicated configuration processor does not execute user-specified program code. In other cases, architecture 600 may utilize PROC 610 to receive the configuration bitstream, load the configuration bitstream into appropriate configuration memory, and/or extract program code for execution.

FIG. 6 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the right of FIG. 6 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 610 within the IC are for purposes of illustration only and are not intended as limitations.

In another example, architecture 600 may include a NoC as described in connection with FIG. 2B. The NoC may connect various endpoint circuits that may be hardwired, implemented in programmable logic, or both. PROC 610, if included in architecture 600, is an example implementation of a host processor such as processor 152 that may be embedded in IC 132.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "processor" means at least one circuit capable of carrying out instructions contained in program code. The circuit may be an integrated circuit or embedded in an integrated circuit.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

In one aspect, a DMA system includes a memory configured to store a plurality of host profiles and a plurality of interfaces, wherein two or more of the plurality of interfaces correspond to different ones of a plurality of host processors. The DMA system further can include a plurality of data engines coupled to the plurality of interfaces. The plurality of data engines can be independently configurable to access different ones of the plurality of interfaces for different flows of a direct memory access operation based on the plurality of host profiles.

The foregoing and other implementations can each optionally include one or more of the following features, alone or in combination. Some example implementations include all the following features in combination.

In another aspect, the plurality of data engines include a descriptor engine configured to look up a first host profile from the plurality of host profiles based on a received doorbell message and fetch a descriptor via an interface of the plurality of interfaces specified by the first host profile.

In another aspect, the plurality of data engines include a data mover engine configured to perform a data transfer flow of the direct memory access operation using an interface of the plurality of interfaces specified by the descriptor.

In another aspect, the interface used by the data mover engine is different from the interface used by the descriptor engine.

In another aspect, the descriptor engine provides the descriptor to user circuitry and the user circuitry, in response to the descriptor, provides the descriptor to the data mover engine, wherein the data mover engine is one of a plurality of different data mover engines.

In another aspect, the plurality of data engines includes a completion engine configured to perform a completion flow of the direct memory access operation using an interface of the plurality of interfaces selected based on a lookup of a second host profile from the plurality of host profiles.

In another aspect, the completion flow includes writing a status descriptor via the interface of the plurality of interfaces selected based on the lookup of the second host profile from the plurality of host profiles.

In another aspect, the plurality of data engines includes an interrupt request engine configured to perform an interrupt flow of the direct memory access operation using an interface of the plurality of interfaces selected based on a lookup of a second host profile from the plurality of host profiles.

In another aspect, the interrupt flow includes generating an interrupt through the interface of the plurality of interfaces selected based on the lookup of the second host profile from the plurality of host profiles.

In another aspect, the data engines include a descriptor engine, a data mover engine, a completion engine, and an interrupt request engine each independently configurable to access a particular interface of the plurality of interfaces.

In one aspect, a method of performing direct memory accesses in a multi-host system includes selecting, using a descriptor engine of a DMA system, a first host profile from a plurality of host profiles stored in a memory based on a received doorbell message and fetching, using the descriptor engine, a descriptor specified by the doorbell message via a first interface of a plurality of interfaces of the DMA system. Two or more of the plurality of interfaces correspond to different ones of a plurality of host processors. Further, the first interface is specified by the first host profile. The method can include initiating, using a data mover engine of the DMA system, a data transfer flow based on the descriptor.

In another aspect, the initiating includes the descriptor engine providing the descriptor to the data mover engine and the data mover engine performing the data transfer flow specified by the descriptor.

In another aspect, the data mover engine performs the data transfer flow through the first interface of the plurality of interfaces. In another aspect, the data mover engine performs the data transfer flow through a second interface of the plurality of interfaces, wherein the second interface is different than the first interface.

In another aspect, the initiating includes the descriptor engine providing the descriptor to user circuitry and the user circuitry, in response to the descriptor, initiating the data transfer flow using the data mover engine.

In another aspect, the method includes performing, using a completion engine of the DMA system, a completion flow using an interface of the plurality of interfaces selected based on a lookup of a second host profile from the plurality of host profiles.

In another aspect, the completion flow includes writing a status descriptor using the interface of the plurality of interfaces selected based on the lookup of a second host profile from the plurality of host profiles.

In another aspect, the method includes generating, using an interrupt request engine of the DMA system, an interrupt flow over an interface of the plurality of interfaces selected based on a second host profile from the plurality of host profiles.

In another aspect, the interrupt flow includes generating an interrupt over the interface of the plurality of interfaces selected based on the second host profile from the plurality of host profiles.

In another aspect, the method includes writing a status descriptor and generating an interrupt over independently selected interfaces of the plurality of interfaces.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A direct memory access system, comprising:
a memory configured to store a plurality of host profiles;
a plurality of interfaces, wherein two or more of the plurality of interfaces correspond to different ones of a plurality of host processors;
a plurality of data engines coupled to the plurality of interfaces; and
a plurality of switches coupling the plurality of interfaces to the plurality of data engines;
wherein each data engine of the plurality of data engines is independently configurable to access different ones of the plurality of host processors via the plurality of interfaces for different flows of a direct memory access operation based on the plurality of host profiles;
wherein the plurality of host profiles specifies addressing information for respective ones of the plurality of host processors and particular ones of the plurality of interfaces to be used to access the respective ones of the plurality of host processors; and
wherein the plurality of switches are configured to connect the plurality of data engines to different ones of the plurality of host processors via the plurality of interfaces using the addressing information from the host profiles for performing the different flows.

2. The direct memory access system of claim 1, wherein the plurality of data engines include a descriptor engine configured to look up a first host profile from the plurality of host profiles based on a received doorbell message and fetch a descriptor via a selected interface of the plurality of interfaces specified by the first host profile.

3. The direct memory access system of claim 2, wherein the plurality of data engines include a data mover engine configured to perform a data transfer flow of the direct memory access operation using a selected interface of the plurality of interfaces specified by the descriptor.

4. The direct memory access system of claim 3, wherein the selected interface used by the data mover engine is different from the interface used by the descriptor engine.

5. The direct memory access system of claim 3, wherein the descriptor engine provides the descriptor to user circuitry and the user circuitry, in response to the descriptor, provides the descriptor to the data mover engine, wherein the data mover engine is one of a plurality of different data mover engines.

6. The direct memory access system of claim 3, wherein the plurality of data engines include a completion engine configured to perform a completion flow of the direct memory access operation using a selected interface of the plurality of interfaces selected based on a lookup of a second host profile from the plurality of host profiles.

7. The direct memory access system of claim 6, wherein the completion flow includes writing a status descriptor via the selected interface of the plurality of interfaces selected based on the lookup of the second host profile from the plurality of host profiles.

8. The direct memory access system of claim 3, wherein the plurality of data engines include an interrupt request engine configured to perform an interrupt flow of the direct memory access operation using a selected interface of the plurality of interfaces selected based on a lookup of a second host profile from the plurality of host profiles.

9. The direct memory access system of claim 8, wherein the interrupt flow includes generating an interrupt through the selected interface of the plurality of interfaces selected based on the lookup of the second host profile from the plurality of host profiles.

10. The direct memory access system of claim 1, wherein each switch of the plurality of switches is configured to connect a selected data engine of the plurality of data engines to different ones of the plurality of host processors via the plurality of interfaces using the addressing information from the host profiles for performing the different flows.

11. A method of performing direct memory accesses in a multi-host system, the method comprising:
- selecting, using a descriptor engine of a direct memory access system, a first host profile from a plurality of host profiles stored in a memory based on a received doorbell message;
- fetching, using the descriptor engine, a descriptor specified by the doorbell message via a first interface of a plurality of interfaces of the direct memory access system, wherein two or more of the plurality of interfaces correspond to different ones of a plurality of host processors, and wherein a plurality of switches couples the plurality of interfaces to a plurality of data engines, the plurality of data engines including the descriptor engine and a data mover engine;
- wherein each data engine of the plurality of data engines is independently configurable to access different ones of the plurality of host processors via the plurality of interfaces for different flows of a direct memory access operation based on the plurality of host profiles;
- wherein the plurality of host profiles specifies addressing information for respective ones of the plurality of host processors and particular ones of the plurality of interfaces to be used to access the respective ones of the plurality of host processors, and wherein the first interface is specified by the first host profile;
- initiating, using a data mover engine of the direct memory access system, a data transfer flow based on the descriptor; and
- wherein the plurality of switches are configured to connect the plurality of data engines to different ones of the plurality of host processors via the plurality of interfaces using the addressing information from the host profiles for performing the different flows, the different flows including the data transfer flow.

12. The method of claim 11, wherein the initiating comprises the descriptor engine providing the descriptor to the data mover engine and the data mover engine performing the data transfer flow specified by the descriptor.

13. The method of claim 12, wherein the data mover engine performs the data transfer flow through the first interface of the plurality of interfaces.

14. The method of claim 12, wherein the data mover engine performs the data transfer flow through a second interface of the plurality of interfaces, wherein the second interface is different than the first interface.

15. The method of claim 11, wherein the initiating comprises the descriptor engine providing the descriptor to user circuitry and the user circuitry, in response to the descriptor, initiating the data transfer flow using the data mover engine.

16. The method of claim 15, further comprising:
- performing, using a completion engine of the direct memory access system, a completion flow using a selected interface of the plurality of interfaces selected based on a lookup of a second host profile from the plurality of host profiles.

17. The method of claim 16, wherein the completion flow includes writing a status descriptor using the interface of the plurality of interfaces selected based on the lookup of the second host profile from the plurality of host profiles.

18. The method of claim 15, further comprising:
- performing, using an interrupt request engine of the direct memory access system, an interrupt flow over a selected interface of the plurality of interfaces selected based on a second host profile from the plurality of host profiles.

19. The method of claim 18, wherein the interrupt flow includes generating an interrupt over the interface of the plurality of interfaces selected based on the second host profile from the plurality of host profiles.

20. The method of claim 15, further comprising:
- writing a status descriptor and generating an interrupt over independently selected interfaces of the plurality of interfaces.

* * * * *